United States Patent [19]

Tutas et al.

[11] Patent Number: 4,789,579

[45] Date of Patent: Dec. 6, 1988

[54] DIE-CUT PAINT MASKING PART

[75] Inventors: Edward P. Tutas, Kenosha; Donald J. Passehl, Waterford, both of Wis.

[73] Assignee: Kranz Incorporated, Racine, Wis.

[21] Appl. No.: 165,923

[22] Filed: Mar. 9, 1988

[51] Int. Cl.[4] .......................... B32B 3/14; B32B 7/06; B32B 7/12

[52] U.S. Cl. ........................................ 428/41; 428/40; 428/80; 118/504; 118/505

[58] Field of Search ........................ 428/40, 41, 43, 80; 118/504, 505

[56] References Cited

U.S. PATENT DOCUMENTS 2,632,269 3/1953 Sanders ............................ 428/40 X 4,722,296 2/1988 Bowskill et al. ................ 118/505 X

*Primary Examiner*—Alexander S. Thomas

*Attorney, Agent, or Firm*—James E. Nilles; Thomas F. Kirby

[57] ABSTRACT

A die-cut paint masking part for use in masking a curved corner surface of an object to be painted comprises a flexible, paint-impervious mask, a layer of pressure-sensitive adhesive material permanently adhering to the underside of the mask, and a removable flexible protective liner releasably adhering to the adhesive layer. Prior to use and while flat, the masking part has a generally Y-shaped configuration and includes a base leg from which diverge a relatively wide branch and a relatively narrow branch. The base leg and wide branch have a common curved first edge. The base leg and narrow branch have a common curved second edge. A notch or cut-out to facilitate folding is formed at the point where the two branches converge. The protective liner is provided with two score lines, formed during die-cutting of the masking part from a web, which define three independently removable liner portions. One score line is located near the free end of the base leg and extends between the aforesaid first and second edges. The other score line is located near the attached end of the narrow branch and extends between the notch and the aforesaid second edge. In use, the first liner portion at the free end of the base leg is peeled off and the mask is adhered to the curved surface to be masked. Then, the second liner portion, which covers the rest of the base leg and the entire wide branch, is peeled off and the mask is bent and further adhered to the curved surface. Finally, the third liner portion covering the entire narrow branch is peeled off and the wide branch is folded over and adhered to the outside of the narrow branch and to the curved surface.

7 Claims, 3 Drawing Sheets

DIE-CUT PAINT MASKING PART

BACKGROUND OF THE INVENTION

1. Field of Use

This invention relates generally to die-cut self-adhesive flexible paint masking parts for masking curved surfaces of objects which are to be painted.

In particular, it relates to improvements in the configuration and construction of such a part to facilitate the application thereof to a curved surface and to ensure precise location of the part thereon.

2. Description of the Prior Art

In the automotive industry, conventional metal front and rear automobile bumpers are rapidly being replaced by molded plastic resilient bumpers, called "fascia", which are of complex design and configuration and have functional and decorative surfaces integrally formed therein. A typical fascia for the front end of an automobile body comprises an elongated main surface which extends across the front of the auto body and integrally formed short side surfaces which extend rearwardly for a short distance along opposite sides of the auto body. Typically, each short side surface is joined to the main surface by a sharply curved corner surface. A facia for the rear end of an auto body is similarly configured but is reversely disposed on the rear end of the auto body. Some fascia include a decorative portion which extends along the front of the main surface, around the sharply curved corner surfaces and along the short side surfaces of the facia. In some cases, lenses for parking lights may be located within or form part of the decorative portion. If, for practical or aesthetic reasons, the fascia is to be spray-painted but the decorative portion is not, it is necessary to apply masking tape and/or masking parts over the decorative portion prior to painting. It is imperative that the masking tape and masking parts, if used, be precisely and exactly located to assure an acceptable paint job. The masking tape can be applied in either of two ways: by successively tearing strips of masking tape from a roll and manually applying each strip along an appropriate section of the decorative portion, or by using a tape dispenser/applicator device to apply the masking tape along the major length of the decorative portion. The procedure of manually applying tape is time-consuming, labor-intensive, unduly costly, wasteful of tape, and sometimes results in misalignment of the side edges of two overlapping strips of tape thereby cauing an unsightly paint job. However, our co-pending U.S. patent application Ser. No. 165,818, filed on even date herewith and assigned to the same assignee as the present application, entitled "Apparatus For Dispensing and Applying Tape", discloses and claims a device for more efficiently and precisely applying tape along the major length of the decorative portion to be masked.

But, whether a strip of tape is applied manually or by means of a dispenser/applicator device, it is especially difficult to properly apply it around a sharply curved corner of a decorative portion. Therefore, it is preferable to employ a die-cut paint masking part which is specifically designed for masking a sharply curved corner.

Some presently available masking parts of this type are die-cut to a desired shape from a commercially available flat web which comprises a first sheet of flexible, paint-impervious masking material fabricated of suitable paper or plastic; a layer of pressure-sensitive adhesive material on the underside of the first sheet and permanently adhered thereto; and a second sheet of flexible material fabricated of suitable paper or plastic which is temporarily adhered to the adhesive layer to protect it but which can be stripped or peeled therefrom to expose the adhesive material.

A die-cut masking part cut from such a web comprises a mask with an adhesive layer on its underside and a removable protective liner for the adhesive layer and is employed as follows. First, prior to application of the mask to a sharply curved corner surface to be masked, a portion of the protective liner is manually peeled away from the adhesive material. Then, the mask is attached to the curved corner surface by the exposed adhesive. Finally, the remaining portion of the protective liner is peeled away and the remainder of the mask is manually pressed, shaped and folded to fit and adhere to the curved corner surface to be masked.

The following important factors must be taken into account when designing, fabricating and using die-cut mask. First, the outline of the die-cut mask part must be suitably designed and shaped to properly and effectively conform, before and after bending, shaping and folding, to the shape of the curved corner surface to which it is to be applied. Second, consideration must be given to how easily and efficiently the mask can be manually manipulated by the user after some or all of the protective liner has been peeled off and while the mask is being applied. The adhesive material on the underside of the mask is very tacky and mishandling can accidentally cause the mask to stick in the wrong place on the surface to be masked, or stick to the hands of the user, or even to itself. Usually, when this happens, the masking part must be discarded and a new one selected. This, of course, is wasteful of time, labor and material. Third, since the web from which the masking parts are die-cut is relatively expensive, it is desirable that the contour of the masking part be such that a maximum number of individual masking parts of desired size can be laid out and die-cut from a given area of the web, without sacrificing other design and contour considerations.

It is desirable, therefore, to provide improved die-cut paint masking parts which meet the aforementioned criteria and overcome the aforementioned drawbacks and have other advantages.

SUMMARY OF THE INVENTION

A masking part in accordance with the invention for use in masking a curved corner surface of an object to be painted comprises a flexible mask of predetermined contour having a layer of pressure-sensitive adhesive permanently adhering on its underside and a removable flexible protective liner temporarily adhering to the adhesive. It is to be understood that the curved corner surface to be masked is bounded by two spaced-apart side edges and two spaced-apart end edges. Preferably, the masking part is die-cut to a predetermined shape, pattern, contour or configuration from a flat web which comprises a first sheet of flexible paint-impervious masking material fabricated of suitable paper or plastic; a layer of pressure-sensitive material on the underside of the first sheet and permanently adhered thereto; and a second sheet of flexible material fabricated of suitable paper or plastic which is temporarily adhered to the layer of adhesive material to protect the latter but which can be stripped or peeled therefrom to expose the adhesive material.

Prior to use and while flat, the masking part has a predetermined shape, pattern, contour or configuration which is generally Y-shaped and includes a base leg portion from which diverge a relatively wide branch portion and a relatively narrow branch portion. The base leg portion and each branch portion each have a free end and an attached end. The base leg portion and wide branch portion have a common curved first edge which matches the curvature of one side edge of the curved surface to be masked. The base leg portion and narrow branch portion have a common curved second edge which matches the curvature of the opposite side edge of the curved surface to be masked. A notch or cut-out to facilitate folding of one branch portion over the other branch portion is formed at the point where the attached ends of the two branch portions converge. The protective liner of the masking part is provided with two score lines, formed during die-cutting of the masking part, which define three independently removable liner portions. One score line is located near the free end of the base leg portion and extends between the aforesaid common curved first and second edges. The other score line is located near the attached end of the narrow branch portion and extends between the notch and the aforesaid common curved second edge.

In use, a first liner portion at the free end of the base leg portion is peeled off, the common curved first edge of the masking part is aligned with one side edge of the curved surface which serves as a guide, and the free end of the base leg portion is adhered to the curved surface by the exposed adhesive. Then, a second liner portion, which covers the rest of the base leg portion and the entire wide branch portion, is peeled off and the base leg portion and entire wide branch portion are bent and adhered to the curved surface by the newly exposed adhesive. Finally, a third liner portion, which covers the entire narrow branch portion, is peeled off, the common curved second edge of the mask is aligned with and adhered to the other side edge of the curved surface which serves as a guide, and finally the narrow branch portion is folded over and is adhered to the outer surface of the wide branch portion of the mask and to the curved surface to be masked by the newly exposed adhesive on the narrow branch portion.

A die-cut paint masking part in accordance with the invention offers several advantages over the prior art. For example, the Y-shaped configuration makes economical use of a minimum amount of web material. The curved common edges of the masking part are designed to match the curvature of the side edges of the curved surface to be masked and thereby provide for a built-in alignment capability. This eliminates guesswork in part placement and results in greater placement accuracy and reduces wastage. The notch between the branch portions of the Y-shaped masking part facilitates bending and proper fold-over of one branch portion with respect to the other and ensures a tight, plainly visible, sealed connection. The masking part employs a minimum of score lines consistent with maximum efficiency in manually removing the several liner portions thereby eliminating needless operational steps. The placement of the score lines and of the removable liner portions and the order of removal ensures accurate placement of the mask on the curved surface and reduces the risk of misalignment, as well as spoilage resulting from mishandling and misalignment. The overall configuration of the masking part enables a maximum number of them to be laid out on a web area of given size and thus makes for more efficient and economical use of the fairly expensive web material. Other objects and advantages of the invention will hereafter appear.

DRAWINGS

DESCRIPTION OF A PREFERRED EMBODIMENT

Figure 1:
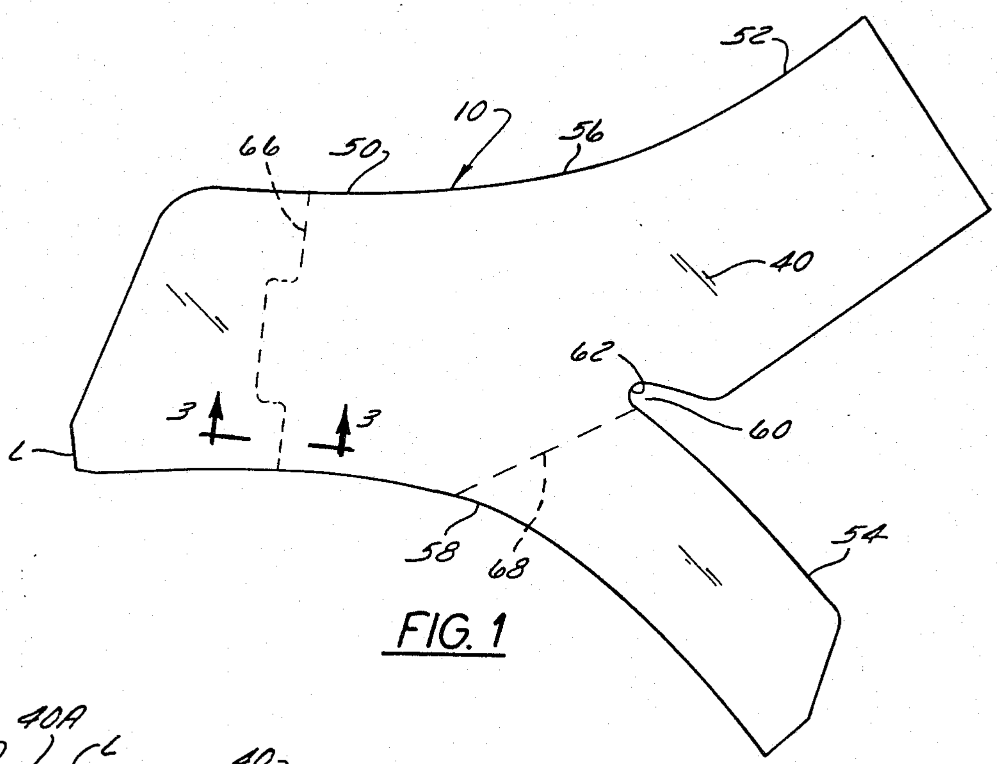
FIG. 1 is a top plan view of a masking part in accordance with the invention.
Figure 3:
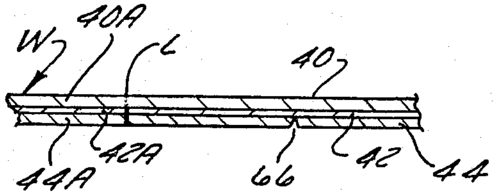
FIG. 3 is a greatly enlarged cross-sectional view of the masking part taken on line 3—3 of FIG. 1.
Figure 2:
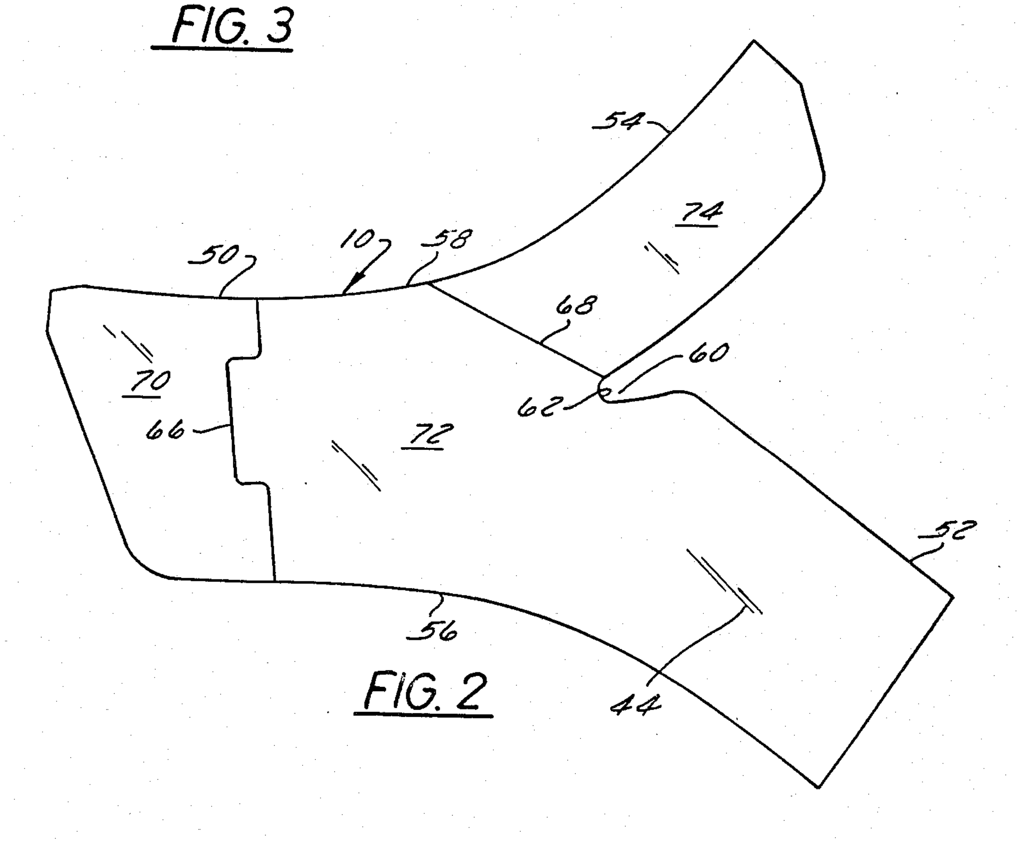
FIG. 2 is a bottom plan view of the masking part shown in FIG. 1.
Figure 4:
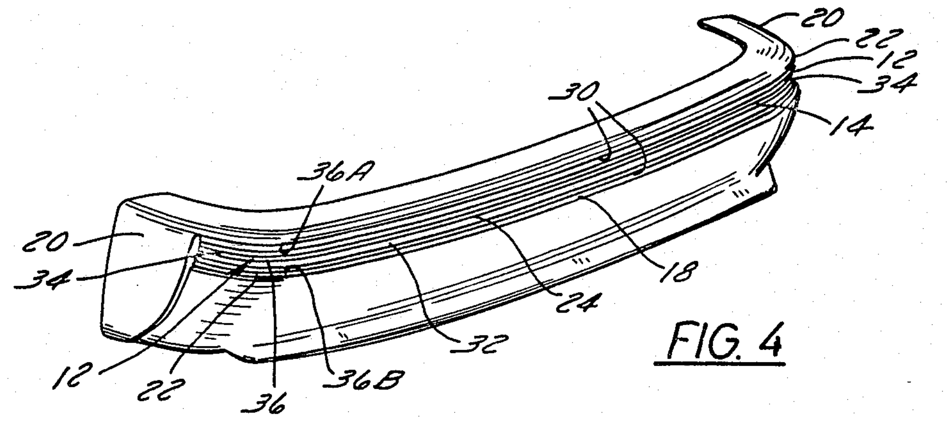
FIG. 4 is a perspective view of an object to be painted and shows a decorative portion thereon which has a curved corner surface which is to be masked during painting by the masking part of FIGS. 1, 2 and 3.

FIGS. 1, 2 and 3 show a masking part 10 in accordance with the invention for use in masking a curved corner surface 12 of an object 16 to be painted shown in FIG. 4. Masking part 10 comprises a flexible mask 40 of predetermined contour having a layer 42 of a pressure-sensitive adhesive material permanently adhering on its underside and a removable flexible protective liner 44 temporarily adhering to adhesive layer 42.

As FIG. 4 shows, object 16 takes the form of a molded plastic resilient automobile bumper or fascia which is of complex design and configuration and has functional and decorative surfaces integrally formed therein. Fascia 16 comprises an elongated main surface 18 which extends across the front of an auto body (not shown) and integrally formed short side surfaces 20 which extend rearwardly for a short distance along opposite sides of the auto body (not shown). Each short side surface 20 is joined to main surface 18 by a sharply curved corner surface 22. Fascia 16 includes a decorative portion 24 which extends along the front of main surface 18, around the sharply curved corner surfaces 22 and along the short side surfaces 22 of the fascia.

Figure 9:
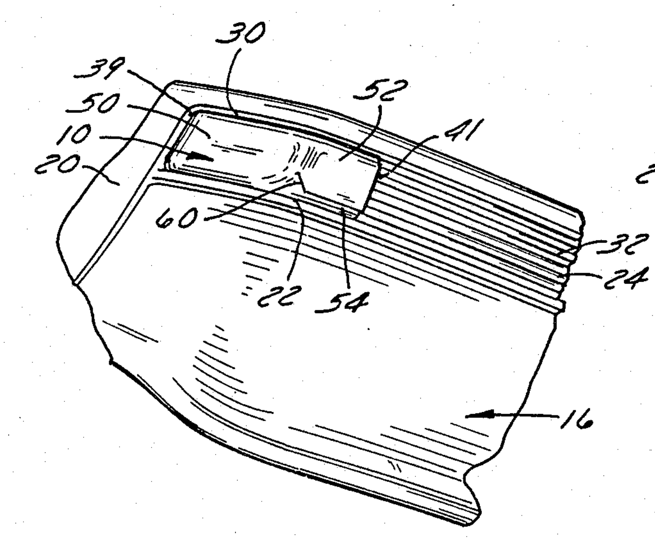

Decorative portion 24 takes the form of a relieved surface which is defined by, or bounded by, an endless groove 30 and comprises a front face 32, two end faces 34 and two corner surfaces 36. As FIGS. 5 through 10 show, flexible mask 40 of masking part 10 is to be applied so as to cover a region including an end face 34, its adjacent corner surface 36 and a portion of front face 32. This region to be covered is herein-referred to as curved corner surface 12 (FIG. 4) and is bounded by two spaced-apart side edges 36A, 36B (FIG. 5) and two spaced-apart end edges 39, 41 (FIG. 9).

As FIGS. 1, 2 and 3 make clear, masking part 10 is die-cut along a cut line L to a predetermined shape, pattern, contour or configuration from a flat web W (FIG. 3) which comprises a first sheet 40A of flexible paint-impervious masking material fabricated of suitable paper or plastic; a layer 42A of pressure-sensitive material on the underside of first sheet 40A and permanently adhered thereto; and a second sheet 44A of flexible material fabricated of suitable paper or plastic which is temporarily adhered to the layer 42A of adhesive material to protect the latter but which can be stripped or peeled therefrom to expose the adhesive material.

Prior to use and while flat, masking part 10 has a predetermined shape, pattern, contour or configuration which is generally Y-shaped and includes a base leg portion 50 from which diverge a relatively wide branch portion 52 and a relatively narrow branch portion 54. The base leg portion 50 and each branch portion 52, 54 each have a free end and an attached end. The base leg portion 50 and wide branch portion 52 have a common curved first edge 56 which matches the curvature of one side edge 36A of curved corner surface 12 to be masked. The base leg portion 50 and narrow branch portion 54 have a common curved second edge 58 which matches the curvature of the opposite side edge 37 of the curved corner surface 12 to be masked. A notch or cut-out 60 to facilitate folding of wide branch portion 52 over the narrow branch portion 54 (or vice-versa) is formed at the point where the attached ends of the two branch portions converge. The end of notch 60 is curved as at 62 to facilitate overlap of the two branch portions 52 and 54 as hereafter appears.

The protective liner 44 of masking part 10 is provided with two score lines 66 and 68, formed during die-cutting of the masking part, which define three independently removable liner portions 70, 72 and 74. One score line 66 is located near hhe free end of base leg portion 50 and extends between the common curved first edge 56 and second edge 58. The other score line 68 is located near the attached end of narrow branch portion 54 and extends between notch 60 and common curved second edge 58.

Figure 5:
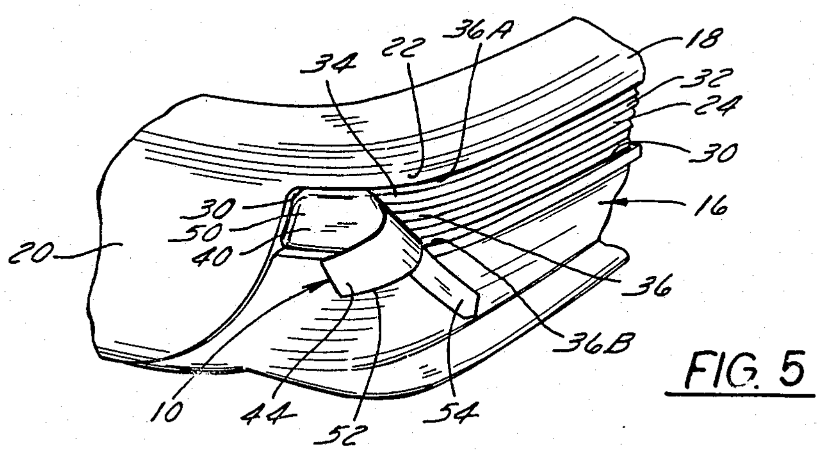
FIGS. 5, 6, 7, 8, 9 and 10 are enlarged perspective views of one end of the object of FIG. 4, and show several consecutive stages or steps in applying the masking part of FIGS. 1, 2 and 3 to the curved corner surface of the decorative portion of the object.
Figure 6:
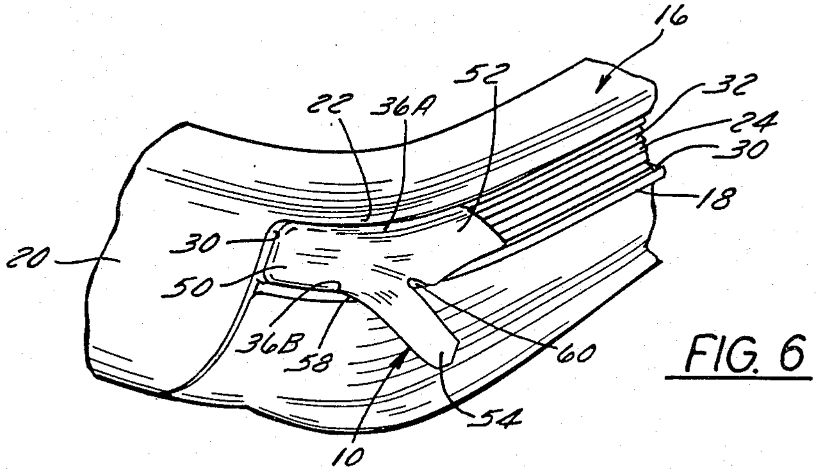
Figure 7:
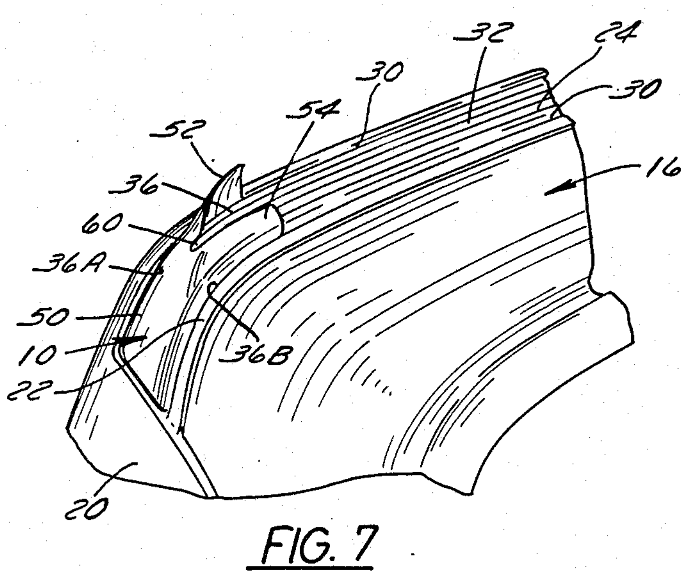
Figure 8:
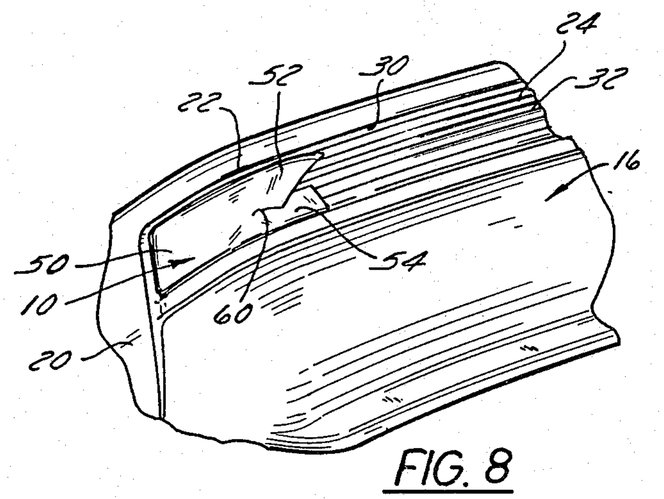

Referring to FIG. 5, in use, first liner portion 70 at the free end of the base leg portion 50 is peeled off, the common curved first edge 56 of masking part 10 is aligned with one side edge 36A of curved surface 12 which serves as a guide, and the free end of base leg portion 50 is adhered to end face 34 of curved surface 12 by the exposed adhesive. Then, as FIG. 6 makes clear, a second liner portion 72, which covers the rest of base leg portion 50 and the entire wide branch portion 52, is peeled off and base leg portion 50 and entire wide branch portion 52 are bent and adhered to corner surface 36 of curved corner surface 12 by the newly exposed adhesive. Then, referring to FIG. 7, third liner portion 74, which covers the entire narrow branch portion 54, is peeled off, the common curved second edge 58 of mask 40 is aligned with (FIG. 7) and adhered to the other side edge 36B of curved corner surface 12 which serves as a guide (FIG. 8), and finally (FIG. 9) wide branch portion 52 is folded over and is adhered to the outer surface of narrow branch portion 52 of mask 40 and to a portion of front face 32 of curved corner surface 12 by the newly exposed adhesive on wide branch portion 52.

At this stage, mask 40 is pressed and rubbed manually until it assumes the shape shown in FIG. 9.

Figure 10:
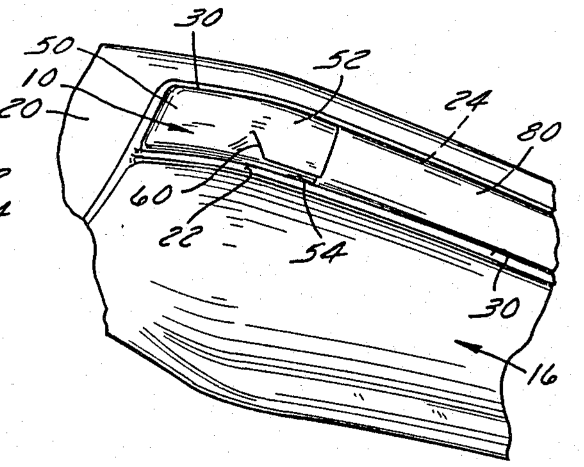

At this point, a masking part (not shown) similar in all respects to masking part 10, but a mirror image thereof, is applied in the same manner to the opposite curved surface 12 of decorative portion 24. Thereafter, a long straight strip of masking tape 80, shown in FIG. 10, is applied to front face 32 of decorative portion 24 between the two masks (only one shown).

After fascia 16 has been spray painted and the paint has dried, the strip of masking tape 80 and the masks 10 are peeled off of decorative portion 24 and discarded.

As the foregoing description makes clear, the outline of die-cut mask part 10 is designed and shaped to properly and effectively conform, before and after bending, shaping and folding, to the shape of curved corner surface 12 to which it is applied. Furthermore, since the liner portions 70, 72 and 74 are removed in sequence, and only as needed, a minimum amount of adhesive is exposed at any given time thereby enabling the mask to be manually manipulated by the user with ease and efficiency, and waste and errors are substantially reduced. Also, the Y-shaped contour of masking part 10 is such that a maximum number of individual masking parts of desired size can be laid out and die-cut from a given area of web W, without sacrificing other design and contour considerations, as compared to some prior art masking parts which have unnecessarily complex or wasteful shapes.

As will be understood, the size, specific shape and rate of curvature of a curved corner surface, such as 12, will vary, depending on the fascia shape involved. This will require certain design changes in the contour of a masking part, such as 10. However, the basic Y-shaped, curved edges, notch 60, and location and minimum number of score lines can be retained to provide a masking device within the scope of the present invention.

We claim:

1. A die-cut flexible paint masking part (10) for use in masking a curved surface (12) of an object (16) to be painted comprising:

- a flat flexible paint-impervious mask (40);
- a layer (42) of pressure sensitive adhesive material permanently adhering to the underside of said mask (40);
- and a flat flexible removable protective liner (44) releasably adhering to the layer (42) of adhesive material;
- said masking part (10), prior to use and while flat, having a generally Y-shaped configuration and including a base leg (50) from which diverge a first branch (52) and a second branch (54);
- each of said base leg (50), said first branch (52) and said second branch (54) having an attached end and a free end;
- said base leg (50) and said first branch (52) having a common curved first edge (56);
- said base leg (50) and said second branch (54) having a common curved second edge (58);
- said masking part (10) having a notch (60) to facilitate folding at a location where said first branch (52) and said second branch (54) converge;
- said protective liner (44) being provided with at least one score line (66, 68) defining a plurality of independently removable liner portions (70, 72, 74).

2. A masking part (10) according to claim 1 wherein said protective liner (44) is provided with two score lines (66, 68) which define three independently removable liner portions (70, 72, 74).

3. A masking part (10) according to claim 2 wherein one (66) of said two score lines (66, 68) is located near the free end of said base leg (50) and extends between said first edge (56) and said second edge (58); wherein the other (68) of said two score lines (66, 68) is located near the attached end of one branch (54) and extends between said notch (60) and one (58) of said first edge (56) and said second edge (58).

4. A masking part (10) according to claim 1 or 2 or 3 wherein one (52) of said first branch (52) and said second branch (54) portions is relatively wider than the other (54).

5. A masking part (10) according to claim 4 wherein said first branch (52) is relatively wider than said second branch (54).

6. A masking part (10) according to claim 3 wherein said first branch (52) is relatively wider than said second branch (54) and wherein said other score line (68) extends between said notch (60) and said second edge (58).

7. A die-cut flexible paint masking part (10) for use in masking a curved surface (12) of an object (16) to be painted comprising:

a flat flexible paint-impervious mask (40);

a layer (42) of pressure-sensitive adhesive material permanently adhering to the underside of said mask (40);

and a flat flexible removable protective liner (44) releasably adhering to the layer (42) of adhesive material;

said masking part (10), prior to use and while flat, having a generally Y-shaped configuration and including a base leg (50) from which diverge a relatively wide branch (52) and a relatively narrow branch (54);

each of said base leg (50), said wide branch (52) and said narrow branch (54) having an attached end and a free end;

said base leg (50) and said wide branch (52) having a common curved first edge (56);

said base leg (50) and said narrow branch (54) having a common curved second edge (58);

said masking part (10) having a notch (60) to facilitate folding at a location where said wide branch (52) and said narrow branch (54) converge;

said protective liner (44) being provided with two score lines (66, 68) which define three independently removable liner portions (70, 72, 74), one score line (66) being located near the free end of said base leg (50) and extending between said first edge (56) and said second edge (58), the other score line (68) being located near the attached end of said narrow branch (54) and extending between said notch (60) and said second edge (58).

* * * * *